United States Patent
Vijay et al.

(10) Patent No.: US 8,311,886 B2
(45) Date of Patent: *Nov. 13, 2012

(54) SYSTEM FOR DISPLAY ADVERTISING OPTIMIZATION WITH UNCERTAIN SUPPLY

(75) Inventors: Bharadwaj Vijay, Sunnyvale, CA (US); John Tomlin, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/688,541

(22) Filed: Jan. 15, 2010

(65) Prior Publication Data

US 2010/0121694 A1    May 13, 2010

Related U.S. Application Data

(63) Continuation-in-part of application No. 12/241,657, filed on Sep. 30, 2008, now abandoned.

(51) Int. Cl.
*G06Q 30/00* (2012.01)

(52) U.S. Cl. .................. 705/14.41; 705/14.43

(58) Field of Classification Search ............... 705/14.41, 705/14.43
See application file for complete search history.

(56) References Cited

U.S. PATENT DOCUMENTS

| | | | |
|---|---|---|---|
| 7,031,932 B1 | 4/2006 | Lipsky et al. | |
| 7,133,848 B2 * | 11/2006 | Phillips et al. | 705/400 |
| 7,146,416 B1 | 12/2006 | Yoo et al. | |
| 7,406,434 B1 | 7/2008 | Chang et al. | |
| 7,499,874 B2 | 3/2009 | Singh et al. | |
| 7,546,249 B2 * | 6/2009 | Main | 705/14.69 |
| 7,774,226 B2 * | 8/2010 | Kalagnanm et al. | 705/7.31 |
| 2007/0078707 A1 * | 4/2007 | Axe et al. | 705/14 |
| 2008/0052219 A1 * | 2/2008 | Sandholm et al. | 705/37 |
| 2009/0298480 A1 * | 12/2009 | Khambete et al. | 455/414.1 |
| 2010/0042485 A1 * | 2/2010 | Wang et al. | 705/14.5 |

* cited by examiner

*Primary Examiner* — Mark A Fleischer
(74) *Attorney, Agent, or Firm* — Brinks Hofer Gilson & Lione

(57) ABSTRACT

An advertisement impression distribution system includes a data processing system operable to generate an allocation plan for serving advertisement impressions. The allocation plan allocates a first portion of advertisement impressions to satisfy guaranteed demand and a second portion of advertisement impressions to satisfy non-guaranteed demand. The data processing system includes an optimizer, the optimizer to establish a relationship between the first portion of advertisement impressions and the second portion of advertisement impressions. The relationship defines a range of possible proportions of allocation of the first portion of advertisement impressions and the second portion of advertisement impressions. The optimizer generates a solution in accordance with an uncertain supply of advertisement impressions, in which a projected supply of advertisement impressions is determined with a model from the uncertain supply of advertisement impressions. The data processing system outputs the allocation plan including the solution to control serving of the advertisement impressions in determined proportions.

14 Claims, 5 Drawing Sheets

SYSTEM FOR DISPLAY ADVERTISING OPTIMIZATION WITH UNCERTAIN SUPPLY

CROSS-REFERENCE TO RELATED APPLICATION

This application is a continuation-in-part of U.S. patent application Ser. No. 12/241,657, filed Sep. 30, 2008, the entirety of which is incorporated by reference herein.

TECHNICAL FIELD

The present description relates generally to a system and method, generally referred to as a system, for optimizing display advertising subject to uncertain supply.

BACKGROUND

A market exists for the distribution of advertising and other information over data communications and entertainment networks. A non-limiting example is insertion of advertising copy supplied by advertisers, for appearance on web pages content offered by media distributors such as news and information services, internet service providers, and suppliers of products related to the advertiser's products or services.

SUMMARY

A system includes a data processing system operable to generate an allocation plan for serving advertisement impressions. The allocation plan allocates a first portion of advertisement impressions to satisfy guaranteed demand and a second portion of advertisement impressions to satisfy non-guaranteed demand. The data processing system includes an optimizer to establish a relationship between the first portion of advertisement impressions and the second portion of advertisement impressions. The relationship defines a range of possible proportions of allocation of the first portion of advertisement impressions and the second portion of advertisement impressions. The optimizer generates a solution in accordance with an uncertain supply of advertisement impressions, in which a projected supply of advertisement impressions is determined with a model for the uncertain supply of advertisement impressions. The data processing system outputs the allocation plan including the solution to control serving of the advertisement impressions in determined proportions.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A supply of ad impression opportunities preferably comprises opportunities to insert on-line advertising ("ad impressions"), such as inserting variable banner ads into web pages that are transmitted to users. The ads can be allocated selectively, based on characteristics of the user or typical users of the particular web page, or otherwise selected to match user and content information, location, timing and other criteria to advertiser specifications, for targeting the ads to potential customers.

The allocation of increments of a supply of advertisements to meet demand may be optimized in a market for use of advertising opportunities (ad impressions). A programmable technique divides all allocations that are projected and later the allocations that actually arise, between a category of pre-committed increments, typically contractually committed ad insertion opportunities with predetermined characteristics (for example, guaranteed delivery (GD) of ads contracts), and a category of spot sales, such as via ad exchange auctions (for example, non-guaranteed delivery (NGD) delivery of ads). A model, in one example stochastic programming with recourse, may be used to make a decision on allocation of inventory from a projected supply of advertisement impressions to demand. When actual supply advertisement impressions and demand is known, supply may be purchased from or sold to a spot market, for example the NGD market, as needed. For example, if the actual supply of advertisements is not sufficient to meet demand of GD ads, supply may be purchased from the NGD market. If there is more actual supply than is needed to satisfy demand, supply may be sold to the NGD market.

Figure 1:
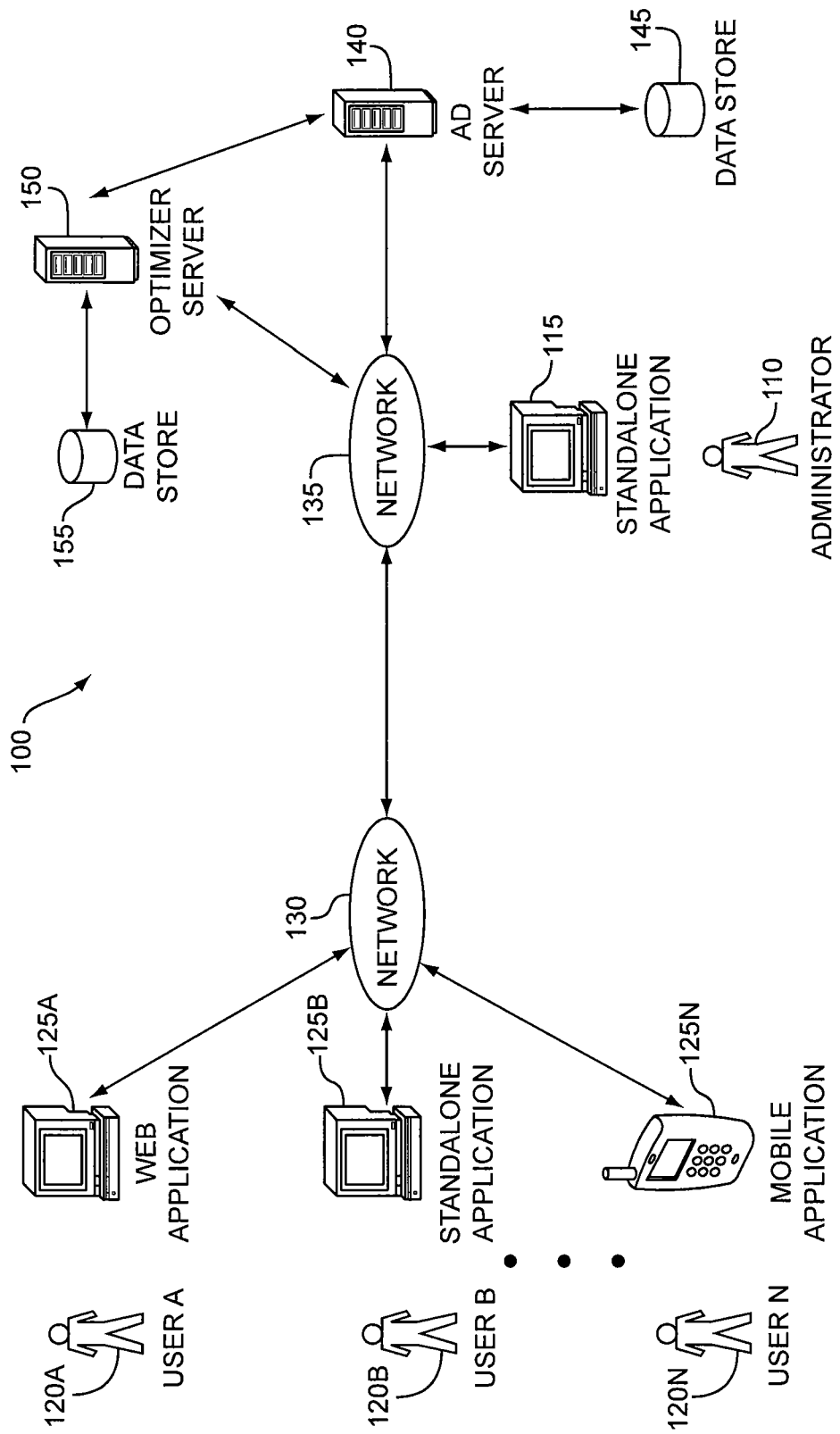
FIG. 1 is a block diagram of a general overview of a network environment and system for distributing advertisement impressions.

FIG. 1 provides a simplified view of a network environment 100 for serving advertisement impressions, factoring projected supply and both guaranteed demand and non-guaranteed demand, in an optimized way. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 100 may include an administrator 110 and one or more users 120A-N with access to one or more networks 130, 135, and one or more web applications, standalone applications, mobile applications 115, 125A-N, which may collectively be referred to as client applications. The network environment 100 may also include one or more advertisement servers 140 and related data stores 145, and one or more optimizer servers 150 and related data stores 155. The users 120A-N may request pages, such as web pages, via the web application, standalone application, mobile application 125 A-N, such as web browsers. The requested page may request an advertisement impression from the advertisement server 140 to fill a space on the page. The advertiser server 140 may serve one or more advertisement impressions to the pages in accordance with delivery instructions from the optimizer server 150. The advertisement impressions may include online graphical advertisements, such as in a unified marketplace for graphical advertisement impressions. Information about projected supply may be determined with a model, for example stochastic programming with recourse. Some or all of the advertisement server 140, the optimizer server 150, and the one or more web applications, standalone application, mobile applications 115, 125A-N, may be in communication with each other by way of the networks 130 and 135.

The networks 130, 135 may include wide area networks (WAN), such as the Internet, local area networks (LAN), campus area networks, metropolitan area networks, or any other networks that may allow for data communication. The network 130 may include the Internet and may include all or part of network 135; network 135 may include all or part of network 130. The networks 130, 135 may be divided into sub-networks. The sub-networks may allow access to all of the other components connected to the networks 130, 135 in the system 100, or the sub-networks may restrict access between the components connected to the networks 130, 135. The network 135 may be regarded as a public or private network connection and may include, for example, a virtual private network or an encryption or other security mechanism employed over the public Internet, or the like.

The web applications, standalone applications and mobile applications 115, 125A-N may be connected to the network 130 in any configuration that supports data transfer. This may include a data connection to the network 130 that may be wired or wireless. Any of the web applications, standalone applications and mobile applications 115, 125A-N may individually be referred to as a client application. The web application 125A may run on any platform that supports web content, such as a web browser or a computer, a mobile phone, personal digital assistant (PDA), pager, network-enabled television, digital video recorder, such as TIVO®, automobile and/or any appliance or platform capable of data communications.

The standalone application 125B may run on a machine that includes a processor, memory, a display, a user interface and a communication interface. The processor may be operatively connected to the memory, display and the interfaces and may perform tasks at the request of the standalone application 125B or the underlying operating system. The memory may be capable of storing data. The display may be operatively connected to the memory and the processor and may be capable of displaying information to the user B 125B. The user interface may be operatively connected to the memory, the processor, and the display and may be capable of interacting with a user B 120B. The communication interface may be operatively connected to the memory, and the processor, and may be capable of communicating through the networks 130, 135 with the advertisement server 140. The standalone application 125B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 125N may run on any mobile device that may have a data connection. The data connection may be a cellular connection, a wireless data connection, an internet connection, an infra-red connection, a Bluetooth connection, or any other connection capable of transmitting data. For example, the mobile application 125N may be an application running on an APPLE IPHONE®.

The advertisement server 140 may include one or more of the following: an application server, a mobile application server, a data store, a database server, and a middleware server. The advertisement server 140 may exist on one machine or may be running in a distributed configuration on one or more machines. The advertisement server 140 may be in communication with the client applications 115, 125A-N, such as over the networks 130, 135. For example, the advertisement server 140 may provide a user interface to the users 120A-N through the client applications 125A-N, such as a user interface for inputting search requests and/or viewing web pages. Alternatively or in addition, the advertisement server 140 may provide a user interface to the administrator 110 via the client application 115, such as a user interface for managing the data source 145 and/or configuring advertisements.

Figure 5:
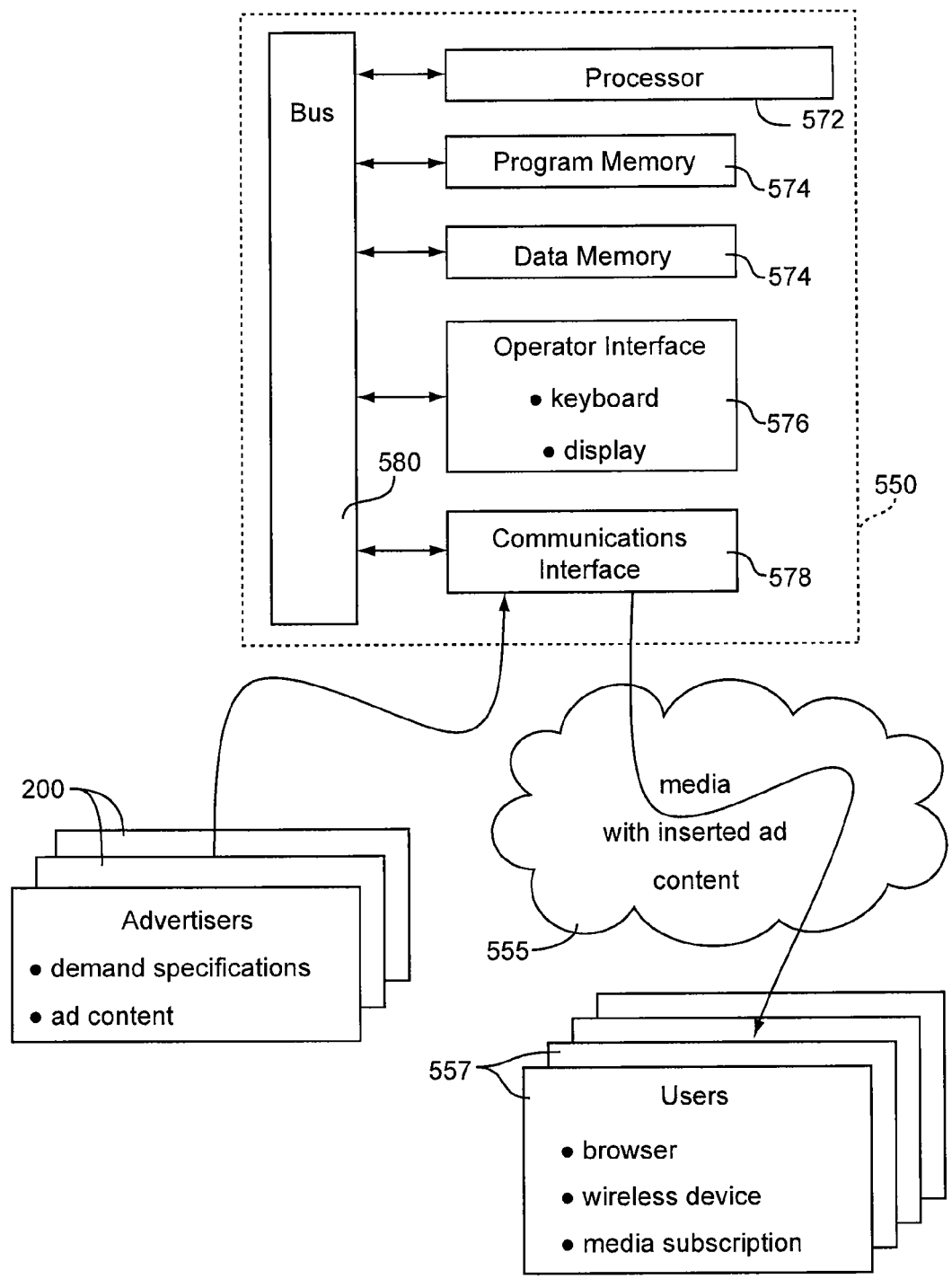
FIG. 5 is an exemplary processing system for executing the advertisement impression distribution systems and methods.

The service provider server 140 and client applications 115, 125A-N may be one or more computing devices of various kinds, such as the computing device in FIG. 5. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 125A may employ the Hypertext Transfer Protocol ("HTTP") to request information, such as a web page, from a web server, which may be a process executing on the advertisement server 140.

There may be several configurations of database servers, application servers, mobile application servers, and middleware applications included in the advertisement server 140. The data store 145 may be part of the advertisement server 140 and may be a database server, such as MICROSOFT SQL SERVER®, ORACLE®, IBM DB2®, SQLITE®, or any other database software, relational or otherwise. The application server may be APACHE TOMCAT®, MICROSOFT IIS®, ADOBE COLDFUSION®, or any other application server that supports communication protocols.

The networks 130, 135 may be configured to couple one computing device to another computing device to enable communication of data between the devices. The networks 130, 135 may generally be enabled to employ any form of machine-readable media for communicating information from one device to another. Each of networks 130, 135 may include one or more of a wireless network, a wired network, a local area network (LAN), a wide area network (WAN), a direct connection such as through a Universal Serial Bus (USB) port, and the like, and may include the set of interconnected networks that make up the Internet. The networks 130, 135 may include communication methods by which information may travel between computing devices.

Figure 2:
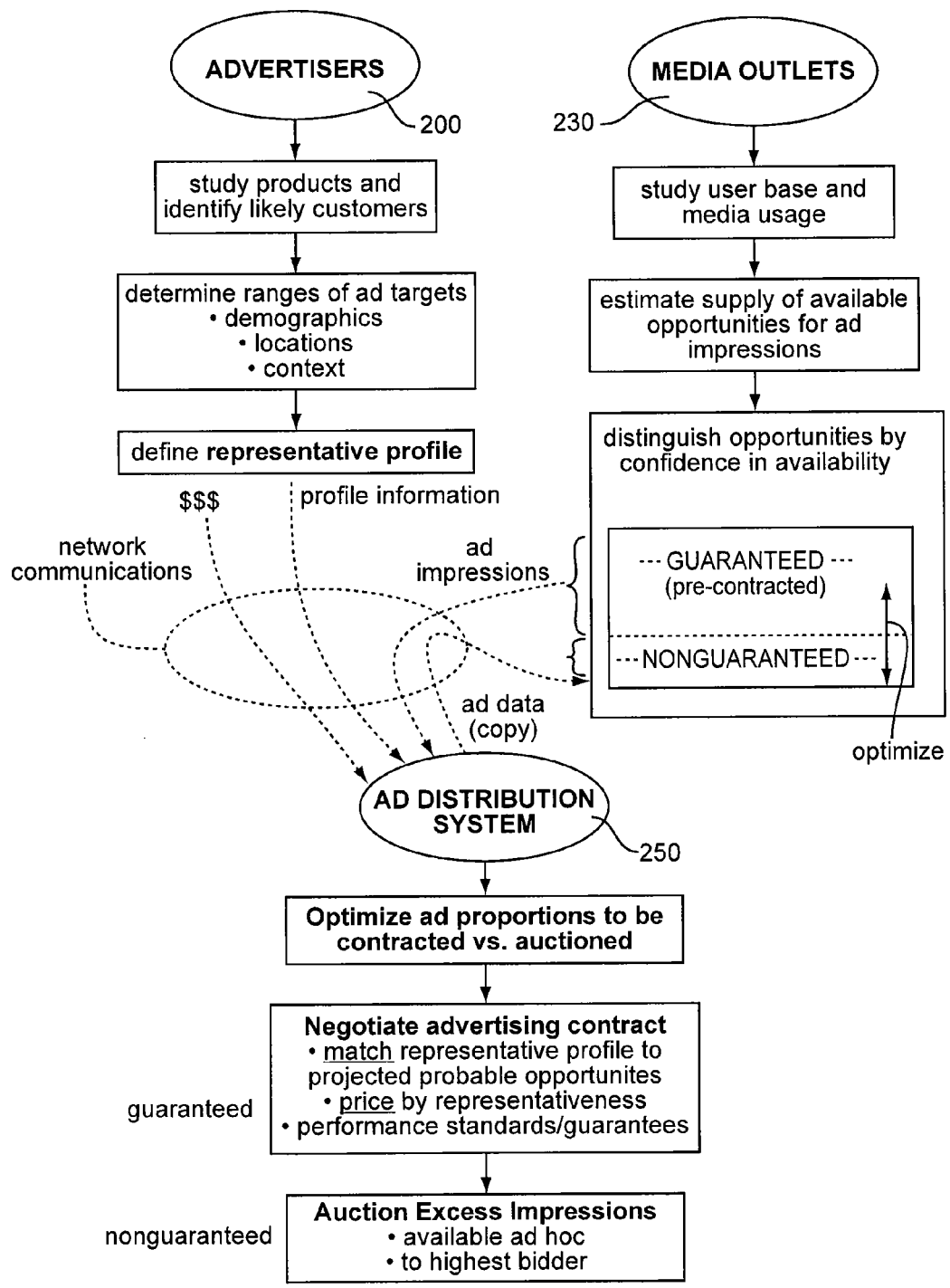
FIG. 2 is a flow/block diagram illustrating a method and system to support a marketing relationship among advertisers, media outlets and an ad distribution system.

FIG. 2 is a flow/block diagram illustrating a method and system to support a marketing relationship among advertisers 200, media outlets 230 and an ad distribution system 250 herein described. Inasmuch as the ad impressions that are to be used to meet the representative demand profile arise over time, an agreement to exploit the ad impressions may rely partly on an estimation of the number and character of ad impressions that will arise. If a media outlet is reasonably sure that a given number of ad impressions of a given type will arise, then the media outlet can commit contractually to using the ad impressions to meet the demand of particular advertisers whose representative profile encompasses ad impressions of that type. In an advertising contract, it is possible for parties to agree to a "best efforts" obligation to produce exploitable ad impressions, but a contract containing obligations to produce a certain number and type of ad impressions may be preferable. The guaranteed ad impressions (guaranteed delivery GD ads) may command a better price than potential ad impressions that may be subject to contract but are not guaranteed (non-guaranteed delivery NGD ads) and are uncertain to arise at all.

This situation may be handled in advertising systems by selling guaranteed ad impressions in advance, and selling the additional ad impressions that may arise under different contractual provisions and effectively in a substantially independent market. The present ad distribution system may be configured to aid in unifying these two different markets.

An efficient and organized technique may satisfy the demand for distribution of advertising to users. The users can be more or less specifically defined by user characteristics. From the advertisers' perspective, an objective is to enable ads to be targeted to users as a function of the users' characteristics. The users' likely characteristics are known to the media outlets that serve the users, at least because user characteristics correlate with the content of media outlets that the users visit. Often the media outlets may have access to additional subscriber information from browsing history, stored cookies and other factors. The advertisers have preferences and rules for distribution of ads, that may include guidelines based on likely user characteristics and also rules for spreading advertising coverage over a range of users. All such rules, guidelines and preferences on the part of an advertiser, which might result from studies and marketing plans, together define a representative profile of the advertising demand of that advertiser. An advertiser's representative demand profile corresponds to a subset of all opportunities that might become available to insert and display an ad (all the "ad impressions"), and may include some insertions that are of more value to the advertiser than others.

Likewise, from knowledge of user characteristics and from projections of the likely range of users who may be interested enough to visit a certain type of media content in the future, the media outlets can make estimates of the numbers and characteristics of users that are likely to be subject to advertising impressions that might be devoted to displaying an advertiser's content. There is a supply and demand market involving discriminating for ad impressions that meet an advertiser's representative demand profile, allocating and using the ad impressions that arise to meet incremental parts of the representative demand, reporting to the advertiser and collecting revenue in exchange for this service.

In FIG. 2, the advertisers 200 determine a representative demand profile that they deem to be appropriate. The advertisers 200 may study their products, commission surveys, collect information from actual customers and so forth, to identify likely targets for ads for a particular product or ads written perhaps to be appealing to some recipients more than others. The advertisers 200 typically have various rules for associating ads with ad impressions of distinct types, and for distributing ads generally over various subsets of a population, not necessarily limited to applying their advertising expenditures only to certain targeted subsets. All such rules and associations make up a representative profile that can be unique to an advertiser or an advertised product.

The media outlets 230 also collect information about their user base and the patterns of user access to and usage of media of one content or another. The media outlets have knowledge of the content of the media and also have knowledge of their users' patterns of access. The media outlets may have subscriber information such as location and demographic data. Some subscriber information can be inferred from a user's access to certain content. All this information is collected and used to study and associate patterns of subscribers and content so as to provide knowledge of the opportunities available to insert advertising that may be of interest to users.

The information collected by media outlets enables projections to estimate the nature and number ad impressions that are likely to become available at a given time. The information can include, for example, an estimated number of users having defined characteristics who are projected to access a particular web page or other media content source over a given time window. Depending on the information collected, the defined user characteristics might include measures of age, gender, income, family associations, etc., with statistical ranges of confidence in the values.

As a result of collection and study of information, the media outlets or their nominee can determine and define a projected probable inventory of ad impressions that may be offered for sale to advertisers. Within statistical limits, the media outlets may believe that an excess inventory of ad impressions may be available. However, the media outlets are not likely to commit as readily to sale of ad impressions under contracts guaranteeing delivery or containing non-performance penalties, when the availability of the excess ad impressions is unsure. The excess ad impressions in that case might be sold on a spot market, for example the NGD market, when it becomes clear that the ad impressions are available, for example, immediately before the ad impressions might be used.

According to one aspect, the two markets are to be merged insofar as possible, for ad impressions sold under guaranteed contracts and ad impressions sold only when they prove to be available. This is accomplished in part by optimizing the selected proportion of ad impressions that will be committed to guaranteed delivery contracts versus the proportion that will be sold if possible when excess ad impressions prove to be available. This is also accomplished in part by providing competition between guaranteed and non-guaranteed demand when accomplishing the delivery of emerging ad impressions as the ad impressions become available. These steps are accomplished by the ad distribution system 250 as an intermediary between the advertisers 200 and media outlets 230.

The ad distribution system 250 functions to optimize the proportions or the division of ads that will be allocated to guaranteed contracts or to ad hoc spot sales. The optimization can be accomplished during negotiations as to whether to commit to guaranteed sales, but may also be accomplished repetitively by the ad distribution system 250 as conditions change over time. In addition to negotiations in advance, the ad distribution system 250 matches demand increments of the representative profiles of advertiser versus projected probable opportunities to use ad impressions, and repetitively updates the projections and rebalances the proportions that are used or planned for use either to satisfy guaranteed obligations or to be sold on the ad hoc spot market. The ad impressions are allocated as a function of price and performance, namely to achieve: (1) a high likelihood that guaranteed obligations are met, (2) a close match of allocated ad impressions with the representative profiles of the advertisers, (3) allocation of the ad impressions to the use that will achieve the highest revenue for the media outlets.

Figure 3:
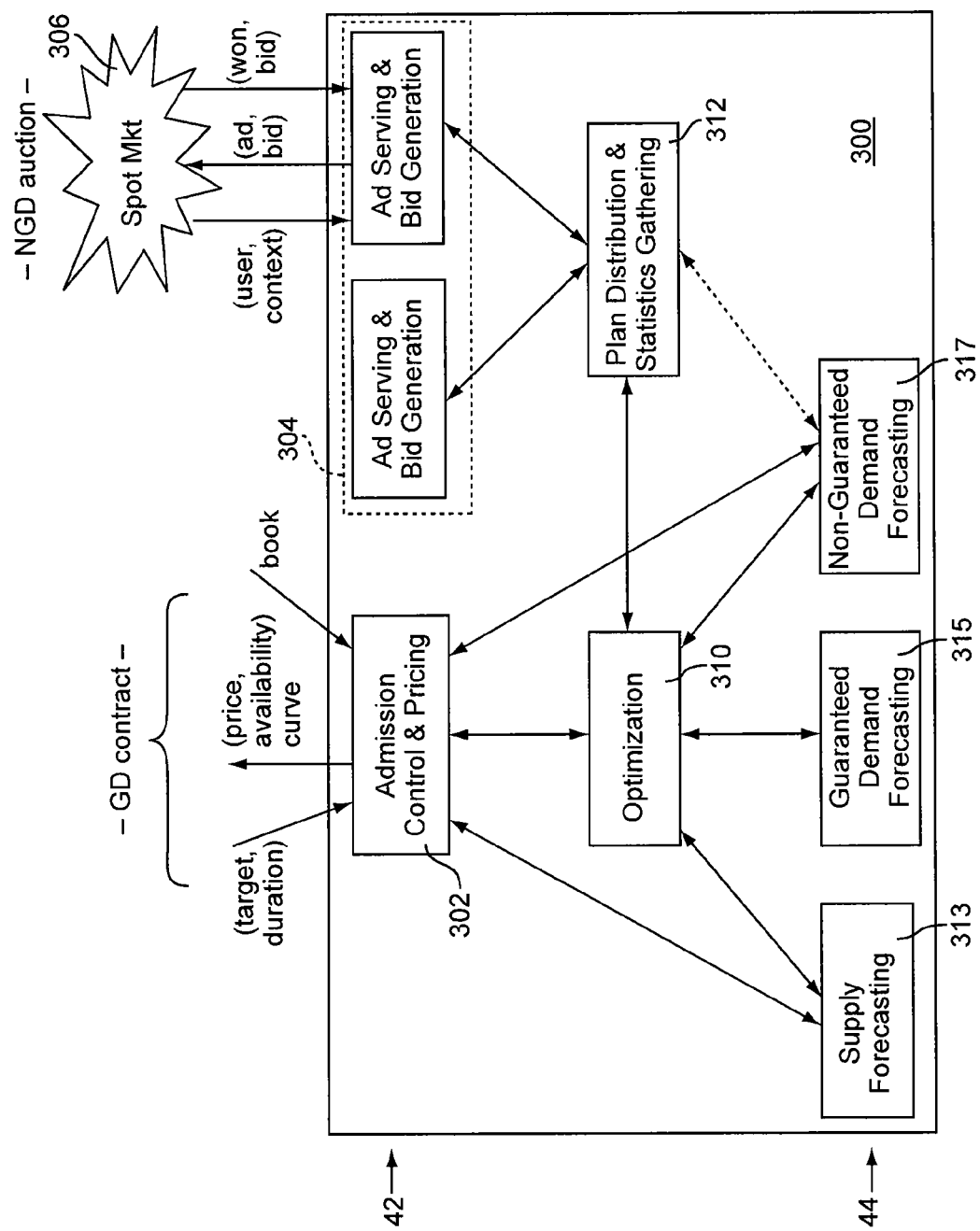
FIG. 3 is a block diagram of an exemplary architecture for advertising delivery systems.
Figure 4:
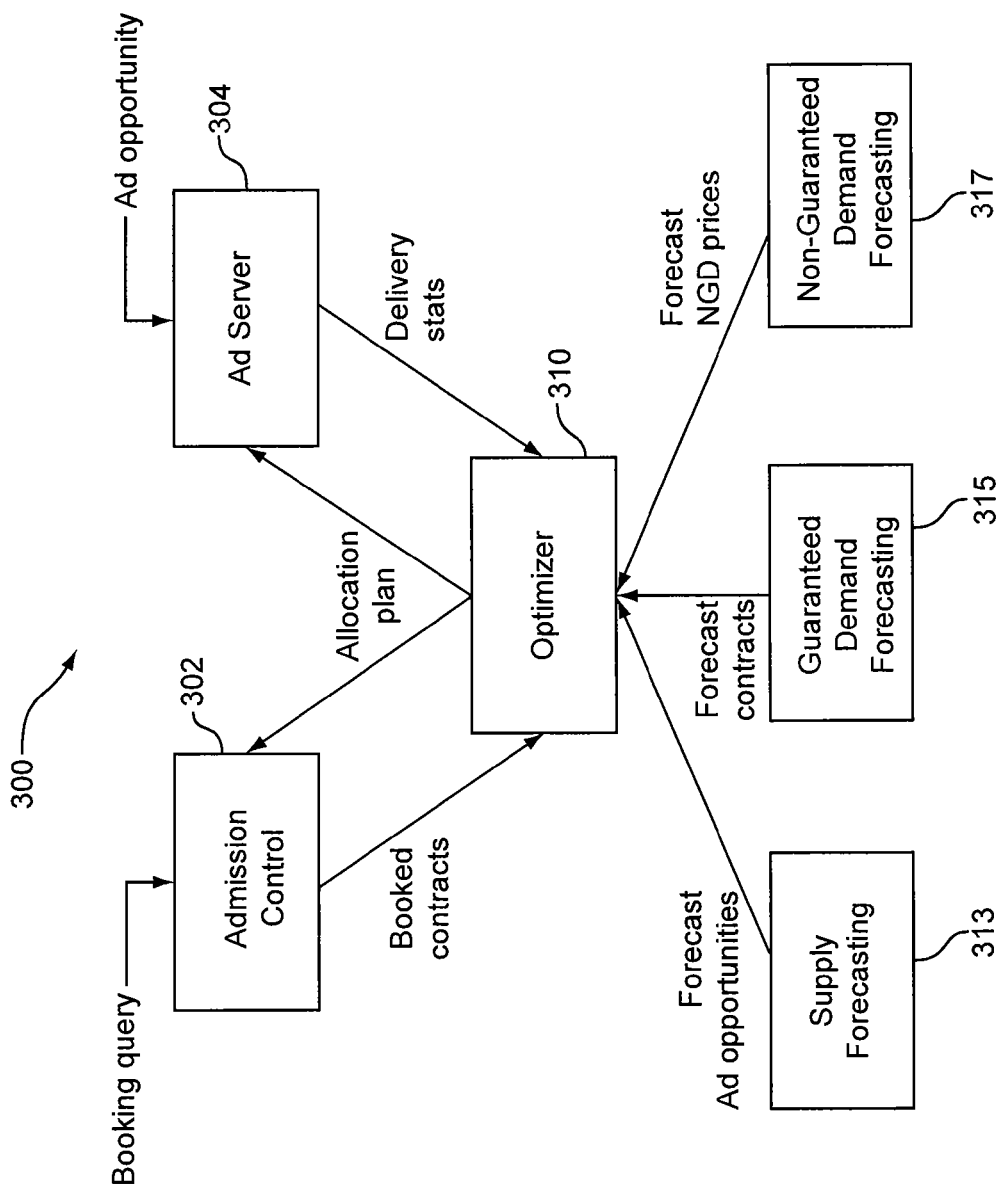
FIG. 4 is block diagram of another exemplary architecture for advertising delivery systems.

FIGS. 3 and 4 are block diagrams illustrating exemplary architectures for advertising delivery systems 300. In FIG. 3, the advertising delivery system 300 is configured to integrate handling of determined commitments to provide ad impressions together with emergent opportunities to make spot sales. The determined commitments are generally termed "guaranteed" contracts or guaranteed delivery (GD) of ad impressions, but the idea of guaranteed contracts encompasses any commitment entered before the moment of allocation of an ad impression to a demand, when the allocation reduces the total supply of remaining ad impressions that will be available, and thus reduces the number of ad impressions that are might yet be committed to another guaranteed contract or might be allocated for spot sales up to the last possible moment.

The advertising delivery system 300 can be embodied as a service of a programmed network server that manages the allocation of the supply of ad impressions available from subscribing website operators and similar media outlets versus the demand by advertisers to use the ad impressions, optionally providing the interface through which ad content is routed to the media outlets for insertion, as windows, banners and other elements of webpages being composed for display by the respective browser programs that compose the webpages for viewing by users, e.g., when surfing the world-wide Web. In an advantageous embodiment supported by user interfaces for the advertisers and media distributors or outlets, the system, including methods, can be configured to manage allocation of guaranteed-delivery ad impressions in a number projected by media distributors to be available, and also to manage the offering and sale ad hoc of excess ad impressions that are found to be available beyond those that were projected. These excess impressions can be sold at auction and used up to the time at which it becomes apparent that the number of impressions in the actual supply will exceed what was projected.

The advertising delivery system 300 in FIG. 3 can unify the allocation and sale of ads, eliminating artificial separation between the ad impression inventory that is sold months in advance under agreements entailing guaranteed delivery (i.e., obligations as to the number and nature of impressions and potential penalties for inability to deliver) versus the remaining inventory, normally from overly-conservative estimates and projections, to be sold using a real-time auction, spot market or terms of "best efforts" non-guaranteed delivery (NGD).

The advertising delivery system 300 manages advertising to serve contracts (i.e., guaranteed ad impression deliveries) and non-guaranteed (NGD) contracts. As a result, high-quality or most sought after impressions may be allocated to the guaranteed contracts and non-guaranteed contracts. This mode for ad impression allocation may realize the full potential of the additional ad impressions that are available when the number of ad impressions proves to be greater than the number that was projected. By automated allocation and management of non-guaranteed delivery impressions, including allocation and contractual commitment of ad impressions immediately prior to the time that the impressions become available, a mix of guaranteed and also non-guaranteed contracts can form a unified marketplace whereby an impression can be allocated to a guaranteed or non-guaranteed contract efficiently, based on the value of the impression to the different contracts, and with less value risked on the ability to project advertisement (ad) impression availability far in advance. A unified marketplace for long term (guaranteed) impressions and short term ones as well, enables equitable allocation of ad impression inventory, and promotes increased competition between guaranteed and non-guaranteed contracts.

One aspect of the system is a bidding mechanism that enables guaranteed contracts to bid on the spot-market for each impression and compete directly with non-guaranteed contracts, while still meeting the guaranteed goals for the contracts. This competition is facilitated if the value of ad impressions on the spot market is subject to highly refined targeting. For example, a selection of ad impressions targeted to "one million Yahoo! Finance users from 1 Aug. 2008-31 Aug. 2008" is diluted and potentially less valuable to certain advertisers compared to "100,000 Yahoo! Finance users from 1 Aug. 2008-8 Aug. 2008 who are males between the ages of 20-35 located in California, who work in the healthcare industry and have recently accessed information on sports and autos."

In order to shift to refined targeting, the advertising industry needs to forecast future ad impression inventory to a fine-grained level of targeting, i.e., numerous variables with tight ranges or close adherence to examples. Advantageously, correlations between different targeting attributes are identified and exploited by producing correlated variable values that can be compared directly to match ad impressions with demand. Taken to a very fine level, it may be appropriate to manage contention in a high-dimensional targeting space with hundreds to thousands of targeting attributes because different advertisers can specify different overlapping targeting combinations. If numerous targeting combinations are accepted and guaranteed, the advertising delivery system 300 may help ensure that sufficient inventory will be available.

In FIG. 3, the advertising delivery system 300 coordinates the execution of various system components, operating as a server with several subsystems devoted to arranging for handling the contractual matching of guaranteed ad impressions allocated to demands according to projections, plus spot market sales of ad impressions that become available, and serving ads to fill the ad impressions.

An admission control and pricing sub-system 302 facilitates guaranteed ad contracts, preferably for a time period up to a year in advance of actual presentation of ad impressions that are contracted. This sub-system 302 assists in pricing guaranteed contracts, and is coupled to supply and demand forecasting subsystems for this purpose.

An ad serving sub-system 304 has a subsystem that matches ad guarantees (demands) with opportunities (ad impressions), including serving the guaranteed impressions and also through ad hoc bidding system whereby selected guaranteed impressions may be supplied by deals on the spot market at favorable terms.

The admission control module 302 has input and output signal paths for interacting with sales persons who negotiate and contract with advertisers. A sales person may issue a query that defines a specified target (e.g., "Yahoo! Finance users who are California males who like sports and autos") and the Admission Control module determines and reports the available inventory of ad impressions for the target and the associated price. The sales person can then book a contract accordingly.

The ad server module 304 takes on an ad impression opportunity, which comprises a user such as a web page viewer and a context, such as a URL for the visited page and information on the theme of the content of the web page begin viewed. Other information useful for targeting may be available, such as the succession of URLs visited by the user prior to the visited page. The ad server module 104 returns a guaranteed ad to fill the ad impression opportunity, and determines an amount that the system is willing to bid for that opportunity in the spot market (the exchange 306).

The operation of the system is orchestrated by an optimization module 110. This module periodically takes into account a forecast of supply (future impressions that are projected), future guaranteed demand (projected guaranteed contracts) and non-guaranteed demand (expected bids in the spot market) that are generated from a supply forecasting module 313, and two demand forecasting modules 315, 317 that are arranged to distinguish between guaranteed and non-guaranteed demand elements. However, as ad impressions are made available, the system can decide whether to use the ad impression to satisfy the guaranteed commitments or to apply them to the spot market.

The optimization module matches supply to demand using an overall objective function as described herein, namely matching instances of ad impressions (supply) to meet instances of demand according to the advertisers' representative profiles of demand, preferably using a norm function that matches supply and demand according to the distance between the variable values of the supply and demand instance attributes in multi-dimensional space. The optimization module sends a summary plan characterizing the optimization results to the admission control and pricing module 302 and to a plan distribution and statistics gathering module 312. The plan distribution and statistics gathering module 312 sends information defining the plan to the ad servers 304. The plan produced by the optimization module can be updated periodically as estimates for supply, demand, and delivered impressions are available, e.g., every few hours.

Given the plan, the admission control and pricing module 302 works as follows. When a sales person issues a targeting query for some duration in the future, the system first invokes the supply forecasting module 313 to identify how much inventory is available for that target and duration. As mentioned earlier, targeting queries can be very fine-grained, thus having numerous values in a multi-dimensional space having numerous coordinate axes. The supply forecasting module uses a scalable multi-dimensional database indexing technique for this purpose, with bit-map indices, to enable correlations between different targeting attributes so that the values of instances of supply and demand have some coordinate axes in common, and so that where values are unknown, a statistical probability may be available either to infer a likely value or to dictate that the representative profile should entail distributing supply or demand instances over a range of values for a coordinate axis.

Generating values on the coordinate axes for supply and demand instances is only a part of the larger problem of allocating supply and demand because there is contention between alternative demands for the same instance of supply and vice versa. For example, if there are two demand contracts: "Yahoo! Finance users who are California males" and "Yahoo! users who are aged 20-35 and interested in sports," it may be advantageous to take into account the correlation between the demand instances to avoid double-counting, in this example because male California finance users may have a high correlation with that age bracket and with an interest in sports.

In order to deal with this contention problem in a high-dimensional space, the supply forecasting system preferably computes the match between supply instances as impression samples as opposed to a raw count of available ad impressions. The samples of impressions are used as inputs to compute whether multiple demand contracts are connected to the attributes of a given impression.

Given the impression samples, the admission control module 302 uses the plan communicated by the optimization module 312 to calculate the contention between contracts in the high-dimensional space, and returns an available inventory measure to the sales persons without double-counting. In addition, the Admission Control module calculates a proposed price for each contract and returns that along with the quantity of available impressions.

Given the plan, the ad server module 304 works as follows. When an opportunity is presented, for example because a user's browser is engaged in generating the display of a web page from html data and encounters a graphic that is linked to a web address associated with the ad server, an IP call is made for associated media content (e.g., text, graphics, animation, etc.). The ad server module 304 calculates the contention among contracts for this impression in a manner similar to what is done by the admission control and pricing module when determining contractual terms beforehand. Given this instance of an available ad impression, and with contention information and knowledge about non-guaranteed demands, the ad server module 304 responds by selecting a contract with an instance to be filled. The ad server module generates a bid that serves to evaluate the contract, and sends information on the contract and the bid to the exchange element 306. At this point, it is possible for the exchange to associate an instance of a non-guaranteed contract (i.e., to sell the ad impression rather than to fill it in satisfaction of the guaranteed contract that is in hand). If the ad impression is sold, the ad server can return content provided from the buyer through the exchange module 306. If the terms available over the exchange are less favorable, the ad server 304 returns the content associated with the guaranteed demand instance.

Matching a given set of contracts (representative profile demands having values associated with various variables) and a set of impression samples (ad impression instances of supply, also having values associated with various values), is a core task, and is served substantially by the optimization module 310. The task is to decide how to allocate the projected or available ad impressions to satisfy the specifications of the demand contracts. One of the goals is a representative allocation. When a contract demand might be satisfied by multiple eligible ad impression types (each of which would contribute in some degree to meeting the demand), it is desirable to allocate some volume of each eligible impression type to corresponding contract demands. In short, it is desirable to allocate supply instances that have a given set of attribute values, to favor targets who have matched attribute values, but not to allocate all the supply to targets based on one attribute value at the expense of others. It is desirable to spread the allocation volume in a manner that is related to the number of instances of all impression types and demand instances, for example proportionately. Advantageously, the allocation favors but does not serve exclusively, those matches wherein certain variable attributes are close in value (i.e., the viewer in context closely meets one of several measures targeted) at the expense of other attributes.

In the unified marketplace, there are two competing sources of demand to which a particular ad impression might be allocated. An ad impression might used to satisfy a guaranteed delivery (GD) obligation under a contract, or might be sold on the non-guaranteed delivery (NGD) spot market. In a market that is not unified, and assuming that there was sufficient demand from advertisers at the prices offered, the ad impressions of the media distributors might be contractually guaranteed only insofar as their projected availability has a high level of confidence. It is an aspect of the present technique, however, not to allocate only on confidence in availability but instead to seek to maximize the efficiency and value of the allocation to both portions of the demand.

Accordingly, the optimization module is used to seek an efficient division of allocations between the guaranteed and spot markets.

When impressions are allocated to guaranteed delivery contracts, the representativeness of the allocation is the major goal, namely closely to match the allocation to the number and type of ad impressions that define the representative profiles of the advertisers. On the other hand, when ad impressions are sold on the non-guaranteed delivery spot market, the goal is merely revenue.

The total available ad impressions are a finite supply. If an impression is allocated to guaranteed delivery, that impression is not available for non-guaranteed demand, and vice versa. The marginal revenue that might be obtained from sale of an ad impression on the spot market therefore is compared directly with the marginal value of using that same ad impression to satisfy a guaranteed delivery obligation. As explained herein, this gives a basis in which to make reasoned decisions as to what proportion of available ad impressions should most efficiently be devoted to meeting guaranteed delivery obligations and what proportion should be sold on the ad hoc spot market, for example at auction. Such decisions are enabled in the optimization module 310.

The marginal revenue from a spot market sale of an ad impression is a lost opportunity that is comparable to a cost for a guaranteed delivery allocation of that ad impression. One task of the optimization module 310 is to decide how to balance the allocations between guaranteed delivery contracts and the non-guaranteed delivery spot market to achieve efficiency and other business goals.

The question of whether to allocate to guaranteed or non-guaranteed allocations is regarded herein as a multi-objective optimization problem with the number and marginal revenue of both allocation categories contributing to a common total but their respective contributions competing for the available supply. Both guaranteed delivery value (which equates to representativeness) and non-guaranteed delivery market revenue (which as an opportunity cost can be assessed against guaranteed delivery value) are modeled explicitly as described herein. Modeling in this way provides a framework to test the results of different functions for evaluating representativeness, enabling the model to identify a corresponding efficient allocation between guaranteed and spot market allocations. The model effectively provides business controls that when imposed on a mathematical optimization that produces a trajectory or range of potential control points, establishes one point in the range to be used as the basis of control. This result accrues using a methodology that establishes a monetary value equivalent to the value of representativeness, for use in solving a multi-objective optimization problem.

FIG. 4 is a block diagram of an alternate architecture for the advertising delivery system 300. The optimizer 310 utilizes inputs from the supply forecasting 313, guaranteed demand forecasting 315 and non-guaranteed demand forecasting 317 modules. Supply forecasting 313 provides forecast ad opportunities, guaranteed demand forecasting 315 provides forecast contracts and non-guaranteed demand forecasting 317 provides forecast non-guaranteed demand prices. The optimizer 310 uses the inputs to run optimization, such as described with regard to the algorithms below, and generate an ad allocation plan.

The optimizer 310 allocates the plans to both admission control 302 and the ad server 304. The admission control 302 uses the allocation plan to calculate inventory level to decide whether or not to accept a booking query. The ad server 304 uses the allocation plan to decide whether to allocate an incoming ad opportunity to serve a guaranteed contract or sell the ad opportunity to the non-guaranteed marketplace. The ad server 304 serves an advertisement to an application 125A-M, such as a browser, of user 120A-N in accordance with the plan. The optimizer 310 executes allocation optimization algorithms periodically, such as when inputs are updated with all the forecasts as well as feedback of newly booked contracts from the admission control 302 and advertisement delivery statistics from the ad server 304. The advertising delivery statistics may include information about a projected supply of ads.

Algorithms, such as those used by the optimizer 310 of the system 300, are modeled mathematically and shown graphically using the variables listed and defined in Table I:

TABLE I

| | |
|---|---|
| i: | index of supply, i = 1, . |
| j: | index of demand j = 1, . . . J |
| $S_i$: | volume of supply i |
| $d_j$: | volume of demand j |
| $r_i$: | NGD reserve price of supply i |
| $B_j$: | set of supplies i which are eligible for demand j |
| $S_j$: | total volume of supply eligible for demand j, i.e. $\Sigma i \in_{B_j} S_i$ |
| $X_{ij}$: | allocation of inventory from supply i to demand j |
| $Z_i$: | volume of supply i sold to the NGD market |

A model, such as the following, may be used to manage supply and demand of ads in the GD and NGD markets.

$$\min \gamma \sum_j D_j(x, \theta) - \sum_i r_i z_i$$

$$\text{s.t.} \sum_{j|i \in B_j} x_{ij} + z_i = S_i \forall i$$

$$\sum_{i \in B_j} x_{ij} = d_j \forall j$$

$$x_{ij} \geq 0 \forall i, j$$

$$z_j \geq 0 \forall i$$

where $D_j(x, \theta)$ is a separable, convex distance function between x and $\theta$.

In some systems, the supplies $s_i$ are assumed fixed and known. In practice this may not be the case and the $s_i$ may be known only as a probability distribution. Stochastic programming methods may be applied to the online advertising inventory allocation model when the supply pools $s_i$ are determined as a probability distribution.

Contract volumes may be assumed as being known and fixed, as are the reserve prices. The model may also assume that the supplies in each pool may be replaced by random variables, say $\beta_i$, with known means $\mu_i$, and cumulative distribution functions $F_i(\beta_i)$.

A two stage Stochastic programming model with recourse may be used. A basic modeling framework was originally described by Beale, E. M. L, "On Minimizing a Convex Function Subject to Linear Inequalities," J. Roy. Statist. Soc., Series B, 17, pp 173-184 (1955) and Dantzig, G. B., "Linear programming under uncertainty," Management Science, 1, pp. 197-206. (1955). The first stage variables are the $x_{ij}$ which may be chosen before the values of the random variables are revealed, while the second stage variables specify what is to be done after the revelation. Variable $z_i$ denotes any excess inventory, which is to be sold on the exchange at reserve price $r_i$. In addition, a non-negative "penalty" variable $y_i$ makes up for any shortfall by either buying inventory from the exchange, or a later make-up contract, as a higher price, say $f_i = r_i(1+\xi_i)$, where $\xi_i > 0$. The supply constraints become:

$$\sum_j x_{ij} + z_i - y_i = \beta_i \qquad (1)$$

and $u_i$ is defined so that $$z_i - y_i = \beta_i - u_i \; \forall i \qquad (2)$$

and the linear terms in the objective function become:

$$E\left[-\sum_i r_i z_i + \sum_i f_i y_i\right].$$

where the $r_i$, $f_i$ are non-negative, and $f_i - r_i = \xi_i r_i > 0$. This may to be interpreted as the expected benefit or penalty to be realized when $u_i$ is not equal to the value of the random variable $\beta_i$.

Now one solution to (2) is:

$$z_i = \beta_i - u_i, \; y_i = 0, \text{ if } \beta_i - u_i > 0 \qquad (3)$$

$$y_i = u_i \pm \beta_i, \; z_i = 0, \text{ if } \beta_i - u_i < 0 \qquad (4)$$

from which $$E\left[-\sum_i r_i z_i + f_i y_i\right] = f_i \int_{-\infty}^{u_i} (u_i - \beta_i) \, dF_i(\beta_i) - r_i \int_{u_i}^{\infty} (\beta_i - u_i) \, dF_i(\beta_i)$$

and defining $g_i = -r_i + f_i$, obtain $$E[-r_i z_i + f_i y_i] = (g_i + r_i) \int_{-\infty}^{u_i} (u_i - \beta_i) \, dF_i(\beta_i) -$$
$$r_i \int_{u_i}^{\infty} (\beta_i - u_i) \, dF_i(\beta_i)$$
$$= g_i \int_{-\infty}^{u_i} (u_i - \beta_i) \, dF_i(\beta_i) - r_i \int_{\infty}^{u_i} (\beta_i - u_i) \, dF_i(\beta_i) -$$
$$r_i \int_{u_i}^{\infty} (\beta_i - u_i) \, dF_i(\beta_i)$$
$$= g_i \int_{\infty}^{u_i} u_i \, dF_i(\beta_i) - g_i \int_{-\infty}^{u_i} \beta_i \, dF_i(\beta_i) -$$
$$r_i \int_{u_i}^{\infty} (\beta_i - u_i) \, dF_i(\beta_i)$$

Recalling that the $\beta_i$ have mean $\mu_i$, the last equation may now be re-expressed as:

$$E[-r_i z_i + f_i y_i] = g_i u_i F_i(u_i) - r_i(\mu_i - u_i) - g_i \int_{-\infty}^{u_i} \beta_i \, dF_i(\beta_i)$$

and the sum of these terms may be added the objective function, to be minimized, to penalize or reward deviation of the $u_i$ from the mean. An explicit form of the stochastic model is then:

$$\min_y \sum_j D_j(x, \theta) + \sum_i \left\{ g_i u_i F_i(u_i) - r_i(\mu_i - u_i) - g_i \int_{-\infty}^{u_i} \beta_i \, dF_i(\beta_i) \right\} \qquad (5)$$

subject to:

$$\sum_{j | i \in B_j} x_{ij} - u_i = 0 \; \forall i \qquad (6)$$

$$\sum_{i \in B_j} x_{ij} = d_j \; \forall j \qquad (7)$$

$$x_{ij} \geq 0 \; \forall i, j \qquad (8)$$

$$u_i \text{ free } \forall i \qquad (9)$$

The distributions $F_i(\cdot)$ remaining fully general. Several embodiments may be possible.

In an embodiment, the distributions $F_i(\cdot)$ may be normal distributions. For simplicity, take a single generic stochastic objective term H and assume $\beta$ has mean $\mu$ and variance $\sigma^2$ and use the notation of Feller, W., Introduction to Probability Theory and its Applications, Vol 1 (third edition), John Wiley and Sons, New York. so that $n(\beta, \mu, \rho^2)$ is the probability density function (pdf), and $N(\beta, \mu, \sigma^2)$ is the cumulative distribution function (cdf), so that $dF(\beta) = n(\beta, \mu, \sigma^2) d\beta$, and:

$$H = gu \int_{-\infty}^{u} n(\beta, \mu, \sigma^2) \, d\beta - g \int_{-\infty}^{u} \beta \cdot n(\beta, \mu, \sigma^2) \, d\beta - r(\mu - u) \qquad (11)$$

$$= gnN(u, \mu, \sigma^2) - g \int_{-\infty}^{u} \beta \cdot n(\beta, \mu, \sigma^2) \, d\beta - r(\mu - u) \qquad (12)$$

Letting $$\Omega = \int_{-\infty}^{u} \beta \cdot n(\beta, \mu, \sigma^2) \, d\beta$$

and $$t = \frac{\beta - \mu}{\sigma},$$

$$u' = \frac{u - \mu}{\sigma},$$

$$d\beta = \sigma \, dt,$$

and noting that $n(\beta, \mu, \sigma^2) = \frac{1}{\sigma} n\left(\frac{\beta - \mu}{\sigma}, 0, 1\right)$, obtain:

$$\Omega = \sigma \int_{-\infty}^{u'} t \cdot n(t, 0, 1) \, dt + \mu \int_{-\infty}^{u} n(\beta, \mu, \sigma^2) \, d\beta \qquad (13)$$

$$= -\sigma n(u', 0, 1) + \mu N(u, \mu, \sigma') \qquad (14)$$

using the identity:

$$-n(x) = \int_{-2\beta}^{x} \beta n(\beta, 0, 1) \, d\beta$$

Since $n(u', 0, 1) = \sigma n(u, \mu, \rho^2)$:

$$H = g u N(u, \mu, \sigma^2) - g\Omega - r(\mu - u) \quad (15)$$

$$= g(u, \mu)N(u, \mu, \sigma^2) + g\sigma n\left(\frac{u-\mu}{\sigma}, 0, 1\right) - r(\mu - u) \quad (16)$$

$$= g(u - \mu)N(u, \mu, \sigma^2) + g\sigma^2 n(u, \mu, \sigma^2) - r(\mu - u) \quad (17)$$

Then:

$$\frac{\partial H}{\partial u} = gN(u, \mu, \sigma^2) + r \quad (18)$$

and $$\frac{\partial^2 H}{\partial u^2} = gn(u, \mu, \sigma^2) \quad (19)$$

An expression for H may be plugged into the stochastic objective, and the expressions used for the first and second derivatives in the optimization algorithm.

Although a general standard deviation σ may be used, in practice all the variances may be some multiple of the mean, i.e. $\sigma^2 = \alpha \mu$ for some a to be empirically determined.

Re-introducing the index i, a change of variable may be introduced $$u_i = \mu_i - v_i$$

so that:

$$H_i = g_i v_i N(\mu_i - v_i, \mu_i, \sigma_i^2) + g\sigma_i^2 n(\mu_i - v_i, \mu_i, \sigma_i^2) - r_i v_i \quad (20)$$

$$\frac{\partial H_i}{\partial v_i} = gN(\mu_i -, v_i, \mu_i, \sigma_i^2) + r_i \quad (21)$$

$$\frac{\partial^2 H_i}{\partial u_i^2} = gn(\mu_i - v_i, \mu_i, \sigma_i^2). \quad (22)$$

The supply constraints become:

$$\sum_{j|i \in B_j} x_{ij} + v_i + \mu_i \quad \forall \, i \quad (23)$$

which puts the expected supply $\mu_i$ in the right hand side (RHS). This is almost in the same form as the deterministic model, except replace the $s_i$ by the expected value and add the new free variables $v_i$. The objective is now:

$$\min y \sum_j D_j(x, \theta) + \sum_i H_i(v_i)$$

Note that $$\frac{\partial^2 H_i}{\partial v_i^2}$$

is positive, therefore the $H_i$ terms may be strictly convex.

In another embodiment the distributions Fi(·) may be log-normal. The logarithms of the random variables βi may be normally distributed. This may have an advantage that the random variable cannot be negative. It may also agree well with observation. Other distributions may be used in other embodiments.

The techniques as described are not limited to an Internet based advertising distribution system and can be applied to other instances where there is a need to allocate supply and demand while delivering value in exchange for revenue wherein the demand increments fall into categories having at least one of quantities and revenues that differ between the categories. Inasmuch there are totals of quantity and revenue, it is known that an allocation to one category reduces the allocation to the other category. A relationship can be projected as described that demonstrates the quantities and revenues that result from allocating the total supply more or less to one or the other of the at least two distinct categories, from zero to 100% or at least from zero to a maximum proportion of the total supply. What remains is to determine the operating point.

One or more goals are imposed on the relationship in addition to accounting for distribution of all the supply to one or the other of the allocation categories. The goal helps to determine a point in the relationship curve that corresponds to a particular proportionate allocation. The supply increments are then allocated to the demand increments at this particular proportion in at least one of a planned allocation and an actual allocation including delivering the supply increments. This allocation can be used when planning the proportion of projected ad impressions will be devoted to guaranteed delivery contracts, or can be used when deciding how to use the successive ad impressions that prove to be available, for example when web page hits occur enabling the transmission of ad copy for insertion into the web page as rendered.

The allocation technique can incorporate functions that calculate the value of representativeness so as to rate the extent to which emerging ads meet advertiser representativeness specifications, i.e., functions that allow a comparison of ad impression characteristics and advertiser specifications as a measure of quality. Alternatively, the allocation can be based on an inferred monetary value based on the opportunity cost of employing an ad impression to meet a guaranteed demand. The opportunity cost is at least equal to the amount that the ad impression would bring in on the spot market. It is advantageous, however, to weight the importance of representativeness versus revenue, preferably to assume that a high degree of representativeness (high ad quality from the advertisers' viewpoint) is an important aspect for the ad distribution service to deliver. Weighting can be accomplished by a factor that favor representativeness or by choosing a proportion of revenue that should be attributable to representativeness, and thus contributes to long term customer goodwill.

Encompassed are methods, systems for practicing the methods, programmable data processing apparatus and/or program data carriers that store code enabling a general purpose computer to practice the subject matter when coupled in data communication with sources of advertiser information, sources of media distributor information, and advertising copy that can be inserted when opportunities are reported by the media distributors.

FIG. 5 illustrates a practical embodiment as a block level diagram wherein the ad distribution system is configured as a computer system 550 that is coupled for data communications, for example to provide media in the form of html web pages and graphics files over a communication path traversing the Internet 555 to various remote users 557, who may be appropriate targets for advertising content provided by advertisers 200. The computer system 550 can be associated with a service such as a directory service or search engine, or a retail or wholesale outlet or any of various operations whose activities include transmission of media to users 557.

The system 550 as shown can include one or more processors 572, implemented using a general or special purpose processing engine such as a microprocessor, controller or other control logic configuration. In the example shown, processor 572 is coupled via a bus 580 to program and data memory 574, an interface 576 for input/output with a local operator, including, for example, a keyboard, mouse, display, etc., and a communications interface 578. The communications interface is generally shown coupled for communications with advertisers 200 or over the Internet with remote users 557; however it is likewise possible that other specific techniques could be employed to deliver data from the advertiser to system 550, such as hand transferred data carriers, telephone discussions or even paper exchanges. The manner of transmitting media to the users 557 likewise is not limited to web page data transmission and could comprise, for example cable or other video program distribution among other possible embodiments.

The memory 574 of the computing system advantageously includes random access volatile memory and ROM, disc or flash nonvolatile memory for initialization. The program instructions are stored in and executed from the program memory to carry out the functions discussed above. The memory can include persistent data storage for accumulated data respecting advertiser and user information, for example on hard drives. Advantageously, the memory 574 of system 550 can contain locally stored versions of advertising copy that is to be inserted, especially for servicing guaranteed demand. The memory 574 also can receive, preferably store and insert at least some advertising copy from advertisers 22 who undertake to use ad impressions obtained on the ad hoc spot market.

Alternatively or in addition, at least part of the advertising copy to be inserted can be stored remotely and accessed by providing to the browser at the user system the appropriate URLs identifying advertising content to be inserted. For example, system 550 can store and submit to the user browser a network address for graphics or other content to be inserted, which address refers to a system at or associated with the advertiser 22, which system is coupled for web communications and is configured to respond to an IP request for addressed graphic or media content. That content can be obtained by bidirectional IP communications between the browser and the system where the content is stored The persistent storage devices of memory 574 may include, for example, a media drive and a storage interface for video or other substantial storage capacity needs. The media drive can include a drive or other mechanism to support a storage media. For example, a hard disk drive, a floppy disk drive, a magnetic tape drive, an optical disk drive, a CD or DVD drive (R or RW), or other removable or fixed media drive may be employed. The storage media can include, for example, a hard disk, a floppy disk, magnetic tape, optical disk, a CD or DVD, or other fixed or removable medium that is read by and written to by the media drive.

In this document, the terms "computer program medium" and "computer useable medium" and the like are used generally to refer to media such as, for example, memory 574, various storage devices, a hard disk and hard disk drive and the like. These and other various forms of computer useable media may be involved in carrying one or more sequences of one or more instructions to processor 572 for execution. Such instructions, generally referred to as "computer program code" (which may be grouped in the form of computer programs or other groupings), when executed, enable the computing system 550 to perform features or functions of the embodiments discussed herein.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

The network could be the worldwide web and the advertising copy could comprise banner ads, graphics in fields of specific size and placement, overlaid moving pictures or animation, redirection to a different URL, etc. The same targeting abilities are also applicable to networks that are interactive to a lesser degree, such as cable television ad insertion, which might be done at a head end or at a hub, or even from a subscriber-specific set top box.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The value of an opportunity to present an ad (i.e., to exploit an "ad impression") may be different for different advertisers and different web page or entertainment genres, because the content of the media delivered by a particular media outlet draws users of a certain type that may correlate more or less strongly with a population of potential customers that an advertiser seeks to reach. Variation in the value of ads, plus the ability to discriminate among ad recipients as a function of the variable content of the web pages they access, plus the ability to shift selectively to route appropriate ad content to a selected user when a web page is rendered, make on-line network communications a very useful and efficient environment for advertising, and especially for targeted advertising.

While one may not conclude definitely that any given subject will respond favorably if exposed to information or advertising, for example by purchasing an advertised product or service, one can establish a set of variables to characterize members of a population, to determine values for those variables that are most characteristic of actual purchasers (and by implication to assess the quality of ad targets). The statistical methods above may enable correlation of a set of variable values with selected subsets of the population consistent with purchasers. Statistical methods also enable correlation among the variables themselves. The result is a set of criteria such as age, gender, location, income range, education, family status, etc., and various rules of thumb that attempt to use combinations of certain values of these criteria to make conclusions about the characteristics and buying preferences of customers.

Variably defined subsets of the population are thereby rated for the likelihood that members of each subset will become a purchaser if exposed to advertising. The subsets of the population can be distinguished by the extent to which members are correlated to an ideal target for an advertising piece.

There are mathematical ways to correlate variable values that may be known about the population of subjects with other variable values that may not be known. There are also ways to infer information such as descriptive and demographic details about subjects, based on the subject's current activities, including the websites that a subject may be visiting, the entertainment programs being viewed, the periodical publications that the person reads, etc. If an advertiser is promoting a product that is associated with the content of a website or a publication, then advertising on the website or in the publication may be more valuable to the advertiser than advertising elsewhere or randomly, because the subjects who will be exposed to the advertising are relatively more highly correlated with likely purchasers than other subjects and are more likely to actually see the advertising.

An advertiser typically does not have close access to an isolated population of subjects who are all very highly correlated with an ideal likely purchaser. Even if the advertiser had access to such a population, the advertiser may not devote 100% of its advertising effort to that population. The advertiser also may want to devote advertising efforts to other populations that are perhaps not so highly correlated, but where advertising still has a positive effect. For example, an advertiser typically seeks to spread advertising expenditures over a wide range of subjects and over a wide geographic area, while perhaps biasing its efforts toward subjects who are or might be correlated with a hypothetical ideal purchaser.

The advertiser may determine a profile of representative advertising over which advertising expenditures shall be devoted. This profile may be discussed with possible advertising outlets such as advertising brokers, advertising services (including on-line services such as that offered by Yahoo!), media outlets such as web page operators and cable media distributors, print publishers and others similarly situated. Negotiations may ensue on the basis that the party controlling the ad impressions demands payment and competing advertisers who want to use the ad impressions are willing to pay for the ad impressions in amounts that related to the extent to which the ad impressions match the advertisers' representative profiles of what the advertisers demand. Matching the use of impressions to adhere to the representative aspects sought by the advertiser may be an objective. Maintaining "representativeness" may achieve long term value.

The market for advertising on Internet web pages is particularly well developed because information is available to characterize the webpage users (the potentially targeted subjects). Infrastructure is in place for changeably inserting ad graphics and moving pictures, such as Internet browsers. Data from click streams and sometimes from locally stored cookies can carry context and history information forward in time as the user surfs through different pages. Internet service providers make at least generalized information on subscribers available routinely, such as the subscriber's zip code. These information sources enable information to be collected to gauge the characteristics of users and enable an advertiser to define a representative advertising allocation for which the advertiser will contract.

Internet webpage operators are also in a good situation for collecting data about information distribution events, such as reporting on the availability and use of ad impressions. Executed ad impressions can be counted and reported with associated context information, time of day, location of recipient and so forth. This information enables the operators to forecast the number of impressions and the characteristics of users that are likely to be available to receive impressions ready to be allocated to those users at a future date and time. The information allows up to the moment monitoring of use of the ad impressions for reporting compliance with contractual obligations to distribute a given number of ads of a given type in a given time window.

Advertisers contract with advertising distributors and advertising services to make use of ad impressions that are available to the distributor or service. The advertising distributor might be a website operator or an advertising warehouse that in turn contracts with website operators. Available impressions may be determined in number and with respect to attributes that determine the value of the impressions to the advertiser. The attributes include characteristics that enable the advertiser to judge how representative the recipients of the impressions will be, compared to likely purchasers and to the advertiser's desired profile of ad distribution. The advertising distributor may agree to distinguish among potential users to whom impressions will be delivered, for example by the attributes of the users or the web content that the users view. This aspect may be written into the contract. The advertising distributor may commit to delivering a given number of impressions to users of defined characteristics or in a defined context over a given time window at some point in the future.

The advertiser may contract with the advertising distributor to deliver a stated number of ad impressions to a stated number of website viewers having stated demographic or other properties that correspond with the representativeness aspects dictated by an advertiser. There may be alternative ways in which the website operator could meet its obligations. As one example, if the agreement is to deliver impressions to users in a certain age group, the website operator might devote a large ratio of available impression opportunities at a time of day when the on-line user population of the age group is low, or a smaller ratio of available impression opportunities at a time of day when the percentage of users in that age group is higher, and in either case get the number of impressions needed to meet the contractual obligation.

The website operator or other advertising distributor has degrees of freedom in which to operate but may need information to define the variations in users by factors that matter, such as the correlation of user age to time of day of on-line access, in the example of a time discrimination aspect. There are various such correlations possible between category ratings that are known or might be inferred.

In order to assess its ability to meet contractual obligations, the advertising distributor projects an estimate of the number of users of given characteristics at some future date and time when offering to sell ad impressions to an advertising campaign manager negotiating for the advertiser. If the seller of ad impressions (the advertising distributor) guarantees that a certain number of ad impressions will be executed to users of given attributes, the seller may be bound to comply, subject to possible contractual penalties.

A seller may decide to guarantee a number of available impressions that are relatively sure to be available at the future data and time. Then if an excess number of impressions actually become available for execution at that time, the seller may seek to exploit them in sales under short term contracts, in an ad hoc spot market or by auction that could occur at any time up to the moment that an ad impression is used. The impressions that were committed by contract according to prudent projections made ahead of time can be deemed "guaranteed" impressions. The remaining impressions are "excess" or "non-guaranteed" impressions and may be sold on last minute terms or on "best efforts" commitments by the ad distributor.

In existing markets for on-line advertising, the manner of sale and the use of guaranteed and non-guaranteed ad impressions may be distinctly different for the two types. Based on their confidence in projections of ad availability, the seller of ad impressions may prefer to sell guaranteed impressions and to develop long term relationships with advertisers characterized by dependability in meeting obligations. However, undue caution when making projections may leave saleable ads unsold, or may affect the prices that quality ad impressions may command. Furthermore, the ability to correlate user characteristics with ad impressions accurately may be best immediately before the ads are used. Therefore, some of the highest quality ads (namely those that are highly correlated with some desired target category) arise only after it is too late to handle them in guaranteed contracts. For these impressions, a second marketplace is advantageous, apart from the marketplace in the sale of projected future impressions under contracts that contain obligations as to the number of impressions that will be provided. This second marketplace is not based substantially on promises of future performance and instead is based on exploiting currently available opportunities.

If the advertising distributor was cautious when negotiating contracts to sell guaranteed impressions, the advertising distributor may have reserved a substantial portion of the impressions that were projected to become available, to avoid contractual penalties if the projections prove too optimistic. These may be sold or else wasted.

If impressions become available that are matched to an advertiser's representative profile, the impressions have a high value in advertising effectiveness to that advertiser. These non-guaranteed impressions might be sold at a high price. Assuming that some proportion of projected impressions are to be reserved to ensure the ability to meet obligations, a problem is presented in how optimally to allocate the impressions between the guaranteed and not guaranteed categories when planning and negotiating contracts for use of projected future ad impressions. Assuming that the decisions have been made, the situation may change when projections are proved or disproved in reality. The above system and method, including optimizer 310, may optimally allocate emergent supply of ad impressions either to obligated/guaranteed impressions or to non-guaranteed impressions, in a manner that is agile and quick.

The system and method may consider multiple objectives. The advertising distributor meets his contractual obligations, and delivers quality impressions to the advertiser in exchange for value received. The advertising distributor's long term performance under these objectives, including meeting contractual obligations for delivery of guaranteed impressions, is important to maintaining mutually beneficial relations between the advertising distributor and its customers, namely the advertisers.

The advertising distributor may maximize revenues obtained in exchange for use of the ad impressions that are available. Revenues can be maximized when accurate projections can be made, including forecasting the supply of impressions that will be available, assessing the demand for guaranteed impressions and forecasting the future demand in the event of short notice ad hoc sales of excess impressions, by auction or otherwise.

The foregoing situation can be considered a confluence of overlapping marketplaces. For each marketplace, the impressions (information exposures) that are available according to projections, or the impressions that actually prove to be available when the time arrives, each represent a finite supply of information distribution opportunities. These information distribution opportunities need to be allocated to the demand for use of ad impression opportunities associated with highly representative advertiser-targeted groups. The allocation may maximize representativeness of ad impressions compared to the advertiser's targeting, which comes from ensuring that guaranteed impressions are faithfully delivered. The allocation may maximize the revenue to the advertising distributor, who may be a media operator, by ensuring that no impressions go unsold, or are sold at prices that are less than the ad impressions should reasonably command.

A given number of impressions may be projected to be available. If the advertising distributor decides to use some number of the projected impressions under guaranteed contracts, then the number available for ad hoc auction is reduced, and vice versa. The above system and method may provide an optimal and efficient technique to control the relative allocations of guaranteed ad impressions under contracts versus non-guaranteed ad impressions to be sold on the spot market.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. An advertisement impression distribution system, comprising:
    a data processing system comprising one or more processors and data memory, the data processing system operable to generate an allocation plan for serving advertisement impressions, the allocation plan to allocate a first portion of advertisement impressions to satisfy guaranteed delivery demand and a second portion of advertisement impressions to satisfy non-guaranteed delivery demand;
    where the data processing system includes an optimizer, the optimizer to establish a relationship between the first portion of advertisement impressions and the second portion of advertisement impressions, the relationship defining a range of possible proportions of allocation of the first portion of advertisement impressions and the second portion of advertisement impressions;

where the optimizer generates a solution in accordance with an uncertain supply of advertisement impressions, in which a the uncertain supply of advertisement impressions is projected using a model of the uncertain supply of advertisement impressions, where the model includes a stochastic programming model with recourse; and where the data processing system outputs the allocation plan including the solution to control serving of the advertisement impressions in determined proportions.

2. The advertisement impression distribution system of claim 1 further comprising an actual supply of advertisement impressions.

3. The advertisement impression distribution system of claim 2, where advertisement impressions are purchased by way of a non-guaranteed demand market if the actual supply of advertisement impressions is less than the projected supply of advertisement impressions.

4. The advertisement impression distribution system of claim 2, where advertisement impressions are sold by way of a non-guaranteed demand market if the actual supply of advertisement impressions is more than the projected supply of advertisement impressions.

5. The advertisement impression distribution system of claim 1, where the solution is expressed as a normal distribution function.

6. The advertisement impression distribution system of claim 1, where generating the solution includes changing a variable.

7. The advertisement impression distribution system of claim 1, where the solution is expressed as a log-normal distribution function.

8. A method for distribution of advertisement impressions in a network, comprising:

generating, with a computer system, an allocation plan for serving advertisement impressions, the allocation plan to allocate a first portion advertisement impressions to satisfy guaranteed delivery demand and a second portion of advertisement impressions to satisfy non-guaranteed delivery demand;

establishing, with the computer system, a relationship between the first portion of advertisement impressions and the second portion of advertisement impressions, the relationship defining a range of possible proportions of allocation of the first portion of advertisement impressions and the second portion of advertisement impressions;

generating, with the computer system, a solution in accordance with an uncertain supply of advertisement impressions, in which the uncertain supply of advertisement impressions is projected using a model of the uncertain supply of advertisement impressions where the model includes a stochastic programming model with recourse; and outputting, with the computer system, the allocation plan including the solution to control serving of the advertisement impressions in the determined proportions.

9. The method of claim 8 further comprising determining an actual supply of advertisement impressions.

10. The method of claim 9, where advertisement impressions are purchased by way of a non-guaranteed demand market if the actual supply of advertisement impressions is less than the projected supply of advertisement impressions.

11. The method of claim 9, where advertisement impressions are sold by way of a non-guaranteed demand market if the actual supply of advertisement impressions is more than the projected supply of advertisement impressions.

12. The method of claim 8, where the solution is expressed as a normal distribution function.

13. The method of claim 8, where generating the solution includes changing a variable.

14. The method of claim 8, where the solution is expressed as a log-normal distribution function.

* * * * *